US011827379B2

(12) United States Patent
Yamada et al.

(10) Patent No.: US 11,827,379 B2
(45) Date of Patent: Nov. 28, 2023

(54) PROCESSING DEVICE AND PROCESSING METHOD

(71) Applicant: MITSUBISHI HEAVY INDUSTRIES, LTD., Tokyo (JP)

(72) Inventors: Takeshi Yamada, Tokyo (JP); Tetsunori Miyoshi, Tokyo (JP); Akira Kitano, Tokyo (JP); Masahiro Aoyama, Tokyo (JP); Takeshi Kadomasu, Tokyo (JP); Yuya Tanaka, Tokyo (JP); Naoki Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 780 days.

(21) Appl. No.: 16/968,683

(22) PCT Filed: Apr. 18, 2019

(86) PCT No.: PCT/JP2019/016569
§ 371 (c)(1),
(2) Date: Aug. 10, 2020

(87) PCT Pub. No.: WO2019/230239
PCT Pub. Date: Dec. 5, 2019

(65) Prior Publication Data
US 2021/0009250 A1    Jan. 14, 2021

(30) Foreign Application Priority Data
May 30, 2018    (JP) .................................. 2018-103740

(51) Int. Cl.
*B64F 5/10*    (2017.01)
*B64C 1/06*    (2006.01)
*B21D 5/14*    (2006.01)

(52) U.S. Cl.
CPC .................. *B64F 5/10* (2017.01); *B21D 5/14* (2013.01); *B64C 1/061* (2013.01)

(58) Field of Classification Search
CPC .............. B64F 5/10; B21D 5/14; B64C 1/061
See application file for complete search history.

(56) References Cited

U.S. PATENT DOCUMENTS

| 5,329,597 A | * | 7/1994 | Kouno | .................. G01B 11/26 |
|---|---|---|---|---|
| | | | | 700/165 |
| 5,330,168 A | | 7/1994 | Enomoto et al. | |

(Continued)

FOREIGN PATENT DOCUMENTS

| JP | H04-069126 A | 3/1992 |
|---|---|---|
| JP | H05-031836 U | 4/1993 |

(Continued)

OTHER PUBLICATIONS

PCT/ISA/210, "International Search Report for International Application No. PCT/JP2019/016569," dated Jul. 16, 2019.

(Continued)

*Primary Examiner* — Gary Collins
(74) *Attorney, Agent, or Firm* — Manabu Kanesaka; Benjamin Hauptman; Kenneth Berner

(57) ABSTRACT

The aim of the present invention is to provide a processing device and a processing method, with which it is possible to improve processing accuracy. A processing device processes a work piece which integrally includes a plate-shaped first curved-surface section and a plate-shaped planar-surface section that extends from the edge of the first curved-surface section in a bending manner. Furthermore, the processing device includes a first clamp device which includes a contact part that makes contact with the first curved-surface section, and a pressing part that presses the first curved-surface section in the direction of the contact part, and which restricts movement of the first curved-surface section in the (Continued)

plate thickness direction; a second clamp device which is movable in the plate thickness direction of the planar-surface section and supports the planar-surface section; and a machining device which machines the first curved-surface section.

6 Claims, 6 Drawing Sheets

(56) References Cited

U.S. PATENT DOCUMENTS

| | | | |
|---|---|---|---|
| 2004/0103706 A1* | 6/2004 | Codatto | B21D 5/045 72/31.11 |
| 2007/0274797 A1 | 11/2007 | Panczuk et al. | |
| 2013/0249158 A1 | 9/2013 | De Mattia | |
| 2018/0104777 A1 | 4/2018 | Tombe et al. | |

FOREIGN PATENT DOCUMENTS

| | | |
|---|---|---|
| JP | H11-138372 A | 5/1999 |
| JP | 4742045 B2 | 8/2011 |
| WO | 2017/073116 A1 | 5/2017 |

OTHER PUBLICATIONS

PCT/ISA/237, "Written Opinion of the International Searching Authority for International Application No. PCT/JP2019/016569," dated Jul. 16, 2019.

Europe Patent Office, "Search Report for European Patent Application No. 19811720.2," dated Apr. 19, 2021.

* cited by examiner

PROCESSING DEVICE AND PROCESSING METHOD

RELATED APPLICATIONS

The present application is National Phase of International Application No. PCT/JP2019/016569 filed Apr. 18, 2019, and claims priority from Japanese Application No. 2018-103740, filed May 30, 2018, the disclosure of which is hereby incorporated by reference herein in its entirety.

TECHNICAL FIELD

The present invention relates to a processing device and a processing method.

BACKGROUND ART

Aircraft components such as a fuselage and main wings of an aircraft are configured by structural members such as a long frame. To achieve an object of improving strength, such a frame is formed by bending and molding a panel-shaped member such that a section in a longitudinal direction has a desired sectional shape and molding the panel-shaped member into a curve shape which is curved along the longitudinal direction since a fuselage and main wings to which the frame is applied each have a curved shape. For this reason, the frame has a complicated shape.

To achieve an object of weight decrease, in some cases, such a frame used in an aircraft is subjected to processing in a panel thickness direction (hereinafter referred to as "panel thickness processing"), such as partially reducing a panel thickness. In the related art, such panel thickness processing is performed through a method called chemical milling in which a frame is immersed in an etching solution.

CITATION LIST

Patent Literature

[PTL 1] Japanese Unexamined Utility Model Registration Application Publication No. 5-31836

SUMMARY OF INVENTION

Technical Problem

However, since chemical milling requires a lot of manual work, requires a long flow time, and also requires costs for maintaining and processing the etching solution, there is a problem that the cost increases.

In order to solve such a problem, performing panel thickness processing on the frame through machine work is considered. When performing panel thickness processing on the frame, a supporting device that supports the frame having a complicated shape as described above is used in some cases (for example, PTL 1). In the device of PTL 1, a side surface clamp cylinder and a bottom surface clamp cylinder press a component against a reference surface to simultaneously clamp a front surface (side surface) and a bottom surface of the component.

However, since the frame is a component manufactured by sheet metal molding as described above, variations in a bending angle occur. For this reason, a shape is different for each frame in some cases. In addition, even a single frame is not uniformly molded and has a different sectional shape depending on a position in the longitudinal direction in some cases.

In the device of PTL 1, since a shape of the reference surface that presses the frame is uniform, a portion that does not fit in the reference surface of the supporting device is generated in a case of supporting a frame of which a sectional shape in the longitudinal direction is not uniform in the device of PTL 1. In addition, in the device of PTL 1, the side surface clamp cylinder and the bottom surface clamp cylinder press the frame against the reference surface. When the frame in a state where the portion that does not fit in the reference surface is brought into a state of being simultaneously pressed against two surfaces including the front surface (side surface) and the bottom surface, there is a possibility that a portion of the frame, which is not pressed, deforms to be lifted up from the reference surface. When panel thickness processing is performed on such a component in a lifted state, there is a possibility of resulting in a problem that accurate processing cannot be performed and processing accuracy reduces.

The present invention is devised in view of such circumstances, and an object thereof is to provide a processing device and a processing method that can improve processing accuracy.

Solution to Problem

In order to solve the problem, the processing device and the processing method of the present invention adopt the following means.

According to an aspect of the present invention, there is provided a processing device that processes an object to be processed integrally having a panel-shaped first portion and a panel-shaped second portion which bends and extends from an edge of the first portion. The processing device includes a restricting portion that has an abutting portion, which abuts against one surface of the first portion, and a pressing portion, which presses the other surface of the first portion in a direction of the abutting portion, and restricts movement of the first portion in a panel thickness direction, a supporting portion that is movable in a panel thickness direction of the second portion and supports the second portion, and a processing unit that processes the other surface of the first portion.

In the configuration, the movement of the first portion in the panel thickness direction is restricted as the pressing portion presses the first portion and the one surface of the first portion is caused to abut against the abutting portion. Accordingly, a position of the second portion in a state where the first portion abuts against the abutting portion differs depending on an angle formed between the first portion and the second portion. In the configuration, since the supporting portion that supports the second portion is movable in the panel thickness direction of the second portion, movement to a position corresponding to the second portion is possible. Accordingly, even when the second portion is at any position, the second portion can be supported by moving the supporting portion. Therefore, regardless of an angle of the object to be processed, which is formed between the first portion and the second portion, the second portion can be supported by the supporting portion in a state where the first portion abuts against the abutting portion. Therefore, even when the object to be processed has a complicated shape of having the first portion and the second portion, the object to be processed can be processed in a stable state by causing the first portion to abut against the abutting portion. From the above, processing accuracy can be improved.

In addition, since the second portion can be supported at a position corresponding to the second portion, the flat surface portion can abut against the first portion and stress generated in the object to be processed can be suppressed in a state where the second portion is supported. Accordingly, the deformation of the object to be processed can be suppressed. Therefore, deformation in which the object to be processed is lifted up from the abutting portion (deformation in which the first portion and the abutting portion are separated from each other) can be prevented. As described above, as the first portion reliably abuts against the abutting portion, the object to be processed can be processed in a stabler state.

In addition, the processing device according to the present invention may further include an abutment determination unit that determines whether or not the abutting portion abuts against the first portion, a drive unit that moves the supporting portion to move the second portion, and a control unit that drives the drive unit based on determination by the abutment determination unit such that the abutting portion abuts against the first portion.

When the drive unit drives the supporting portion to move the second portion, the first portion formed integrally with the second portion also moves. That is, the drive unit can move the first portion via the second portion by driving the supporting portion.

In the configuration, the drive unit is driven based on determination by the abutment determination unit such that the abutting portion abuts against the first portion. Accordingly, as the first portion more reliably abuts against the abutting portion, the object to be processed can be processed in a stable state.

In addition, the processing device according to the present invention may further include a distance deriving unit that derives a distance between the abutting portion and the other surface of the first portion, a drive unit that moves the supporting portion to move the second portion, and a control unit that drives the drive unit based on the distance derived by the distance deriving unit such that the abutting portion abuts against the first portion.

In the configuration, the drive unit is driven based on the distance derived by the distance deriving unit such that the abutting portion abuts against the first portion. Accordingly, as the first portion more reliably abuts against the abutting portion, the object to be processed can be processed in a stable state.

In addition, the processing device according to the present invention may further include an angle deriving unit that derives an angle formed between the first portion and the second portion, a drive unit that moves the supporting portion to move the second portion, and a control unit that drives the drive unit based on the angle derived by the angle deriving unit such that the abutting portion abuts against the first portion.

In the configuration, the drive unit is driven based on the angle derived by the angle deriving unit such that the abutting portion abuts against the first portion. Accordingly, as the first portion more reliably abuts against the abutting portion, the object to be processed can be processed in a stable state.

In addition, the processing device according to the present invention may further include a load deriving unit that derives a load applied to the pressing portion, a drive unit that moves the supporting portion to move the second portion, and a control unit that drives the drive unit based on the load derived by the load deriving unit such that the load decreases.

When the first portion of the object to be processed separates from the abutting portion, a load is applied to the pressing portion in a direction opposite to a pressing direction. In the configuration, the load is derived by the load deriving unit, and based on the derived load, the drive unit is driven such that the load decreases. Accordingly, as the first portion more reliably abuts against the abutting portion, the object to be processed can be processed in a stable state.

According to another aspect of the present invention, there is provided a processing method for an object to be processed integrally having a panel-shaped first portion and a panel-shaped second portion which bends and extends from an edge of the first portion. The processing method includes a step of restricting movement of the first portion in a panel thickness direction by causing one surface of the first portion to abut against an abutting portion and pressing the other surface of the first portion with a pressing portion, a step of supporting the second portion such that movement of the second portion in a panel thickness direction is allowed, and a step of processing the other surface of the first portion.

Advantageous Effects of Invention

In the present invention, processing accuracy can be improved.

DESCRIPTION OF EMBODIMENTS

Hereinafter, a processing device and a processing method according to an embodiment of the present invention will be described with reference to FIGS. 1 to 5.

A processing device 1 according to the embodiment is used when manufacturing a frame that configures an aircraft component used as a reinforcing material for an aircraft fuselage structure.

Figure 1:
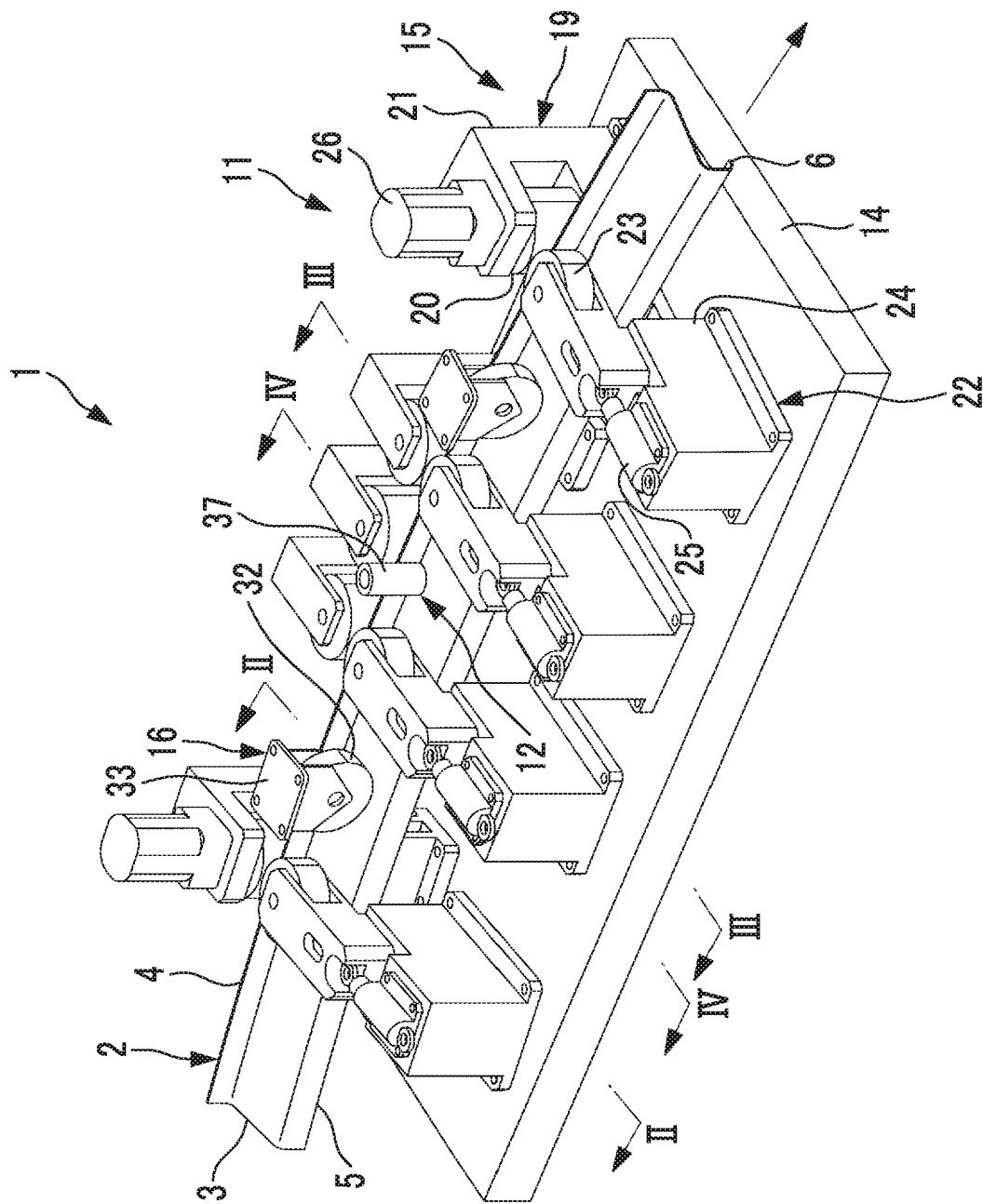
FIG. 1 is a perspective view illustrating main parts of a processing device according to an embodiment of the present invention.
Figure 2:
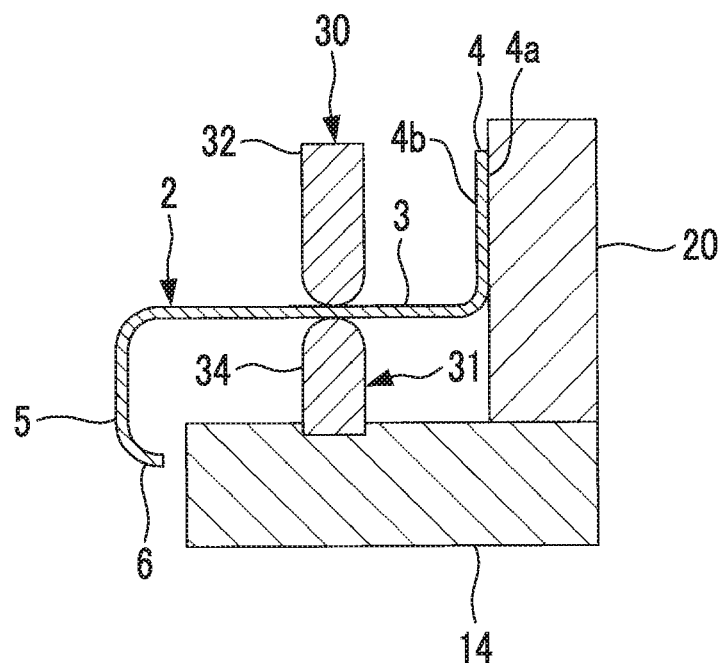
FIG. 2 is a view schematically illustrating an end surface taken along line II-II of FIG. 1.
Figure 3:
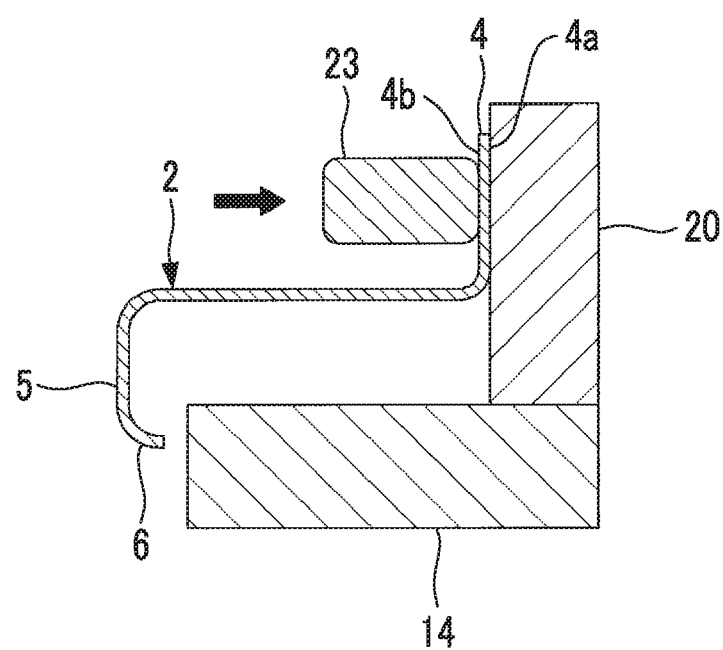
FIG. 3 is a view schematically illustrating an end surface taken along line III-III of FIG. 1.

As illustrated in FIG. 1, the processing device 1 includes a supporting device 11 that supports a workpiece (object to be processed) 2, a machining device (processing unit) 12 that performs machining on the workpiece 2 supported by the supporting device 11, and a control device (control unit) 13 that controls the supporting device 11 and the machining device 12.

The workpiece 2 according to the embodiment is a long member, is curved such that a shape in a longitudinal direction is an arc, and has a substantially Z-shaped section in the longitudinal direction. The workpiece 2 is molded by performing bending, in which a sectional shape is imparted, on a panel-shaped member made of an aluminum alloy and performing curving on the member, on which bending is performed, such that a shape in the longitudinal direction is an arc.

The workpiece 2 integrally has a flat surface portion (second portion) 3 that is a panel-shaped member which extends substantially horizontally and has a flat surface, a first curved surface portion (first portion) 4 that is a panel-shaped member which substantially vertically bends and extends upward from one edge of the flat surface portion 3 in a transverse direction and has a curved surface, a second curved surface portion 5 that has a panel-shaped member which substantially vertically bends and extends downward from the other edge of the flat surface portion 3 in the transverse direction and has a curved surface, and a lip portion 6 that protrudes substantially vertically in a first curved surface portion 4 direction from a lower edge of the second curved surface portion 5.

The processing device 1 according to the embodiment is a device for performing machining on the flat surface portion 3, the first curved surface portion 4, and the second curved surface portion 5 such that a panel thickness reduces, in order to decrease the weight of such a workpiece 2.

The supporting device 11 is a device that supports the workpiece 2 and transports the workpiece 2 in a predetermined direction. In the embodiment, in a state where the flat surface portion 3 is a substantially a horizontal surface and a state where the first curved surface portion 4 is a substantially a vertical surface, the workpiece 2 is supported by the supporting device 11.

The supporting device 11 includes a first clamp device (restricting portion) 15 that restricts movement of the first curved surface portion 4 in a panel thickness direction, a second clamp device (supporting portion) 16 that supports the flat surface portion 3, and a drive unit 17 (refer to FIG. 5) that moves the second clamp device 16 in the panel thickness direction of the flat surface portion 3.

A plurality of first clamp devices 15 are provided at a predetermined interval along the longitudinal direction of the workpiece 2. In addition, each of the first clamp devices 15 has an abutting portion 19 that abuts against one surface 4a of the first curved surface portion 4 and a pressing portion 22 that presses the other surface 4b of the first curved surface portion 4 toward a direction of the abutting portion 19 (also refer to FIG. 3).

The abutting portion 19 has a cylindrical abutting roller 20 and an abutting roller supporting portion 21 that supports the abutting roller 20 so as to be rotatable about a central axis that extends in a substantially vertically up-and-down direction. The abutting roller 20 is supported by the abutting roller supporting portion 21 such that an outer peripheral surface thereof is a substantially vertical surface. The abutting roller supporting portion 21 is fixed to a main body 14 of the supporting device 11, and supports the abutting roller 20 to restrict movement in a horizontal direction and the up-and-down direction. In addition, a motor 26 that rotationally drives the abutting roller 20 about the central axis is provided in some or all of the plurality of abutting portions 19 provided.

The pressing portion 22 is disposed to be separated from the abutting portion 19 at a predetermined distance, and is disposed to face the abutting portion 19. The pressing portion 22 has a cylindrical pressing roller 23, a pressing roller supporting portion 24 that supports the pressing roller 23 so as to be rotatable about the central axis that extends in the substantially vertically up-and-down direction, and a cylinder portion 25 that moves the pressing roller supporting portion 24 in the direction of the abutting portion 19. The pressing roller 23 is supported by the pressing roller supporting portion 24 such that an outer peripheral surface thereof is a substantially vertical surface. The cylinder portion 25 moves the pressing roller supporting portion 24 and the pressing roller 23 in the direction of the abutting portion 19 by a drive force such as a hydraulic pressure.

As described above, the first clamp device 15 causes the one surface 4a of the first curved surface portion 4 to abut against the outer peripheral surface of the abutting roller 20 by a pressing force of the pressing portion 22, thereby restricting the movement of the first curved surface portion 4 in the panel thickness direction. In other words, the first clamp device 15 restricts the movement of the first curved surface portion 4 in the panel thickness direction by causing the first curved surface portion 4 to be sandwiched between the pressing portion 22 (specifically, the pressing roller 23) and the abutting portion 19 (specifically, the abutting roller 20). In addition, since the movement of the abutting roller 20 is restricted by the abutting roller supporting portion 21, the first clamp device 15 restricts the movement of the first curved surface portion 4 with the outer peripheral surface of the abutting roller 20 as a reference surface. In addition, the abutting roller 20 and the pressing roller 23 each are rotationally driven about the central axis by a drive force of the motor 26 to transport the workpiece 2 in the predetermined direction.

A plurality of second clamp devices 16 are provided at a predetermined interval along the longitudinal direction of the workpiece 2. In addition, each of the second clamp devices 16 has an upper roller portion 30 that abuts against the flat surface portion 3 from one surface direction (from above in FIGS. 1 and 2) and a lower roller portion 31 that abuts against the flat surface portion 3 from the other surface direction (from below in FIGS. 1 and 2), and is movable in the panel thickness direction of the flat surface portion 3 (also refer to FIG. 2).

The upper roller portion 30 has a cylindrical upper roller 32 and an upper roller supporting portion 33 that supports the upper roller 32 so as to be rotatable about a central axis that extends in the substantially horizontal direction. The upper roller 32 is supported by the upper roller supporting portion 33 such that an outer peripheral surface thereof is a surface orthogonal to a vertical surface. The upper roller supporting portion 33 is fixed to the main body 14 of the supporting device 11, and supports the upper roller 32 so as to be movable in the panel thickness direction of the flat surface portion 3 (up-and-down direction in FIGS. 1 and 2).

The lower roller portion 31 has a cylindrical lower roller 34 and a lower roller supporting portion (not illustrated) that supports the lower roller 34 so as to be rotatable about the central axis that extends in the substantially horizontal direction. The lower roller 34 is supported by the lower roller supporting portion such that an outer peripheral surface thereof is a surface orthogonal to a vertical surface. The lower roller supporting portion is fixed to the main body 14 of the supporting device 11, and supports the lower roller 34 so as to be movable in the panel thickness direction of the flat surface portion 3 (up-and-down direction in FIGS. 1 and 2).

In this manner, the second clamp device 16 causes the flat surface portion 3 to be sandwiched between the upper roller 32 and the lower roller 34 and rotationally drives about the central axis, thereby transporting the workpiece 2 in the predetermined direction.

The drive unit 17 has an upper roller drive unit (not illustrated) that is connected to the upper roller 32 and moves the upper roller 32 in the panel thickness direction of the flat surface portion 3 (up-and-down direction in FIGS. 1 and 2) and a lower roller drive unit (not illustrated) that moves the lower roller 34 in the panel thickness direction of the flat surface portion 3. The drive unit 17 interlocks the upper roller drive unit with the lower roller drive unit, and moves the upper roller 32 and the lower roller 34 such that the flat surface portion 3 can be sandwiched therebetween.

Figure 4:
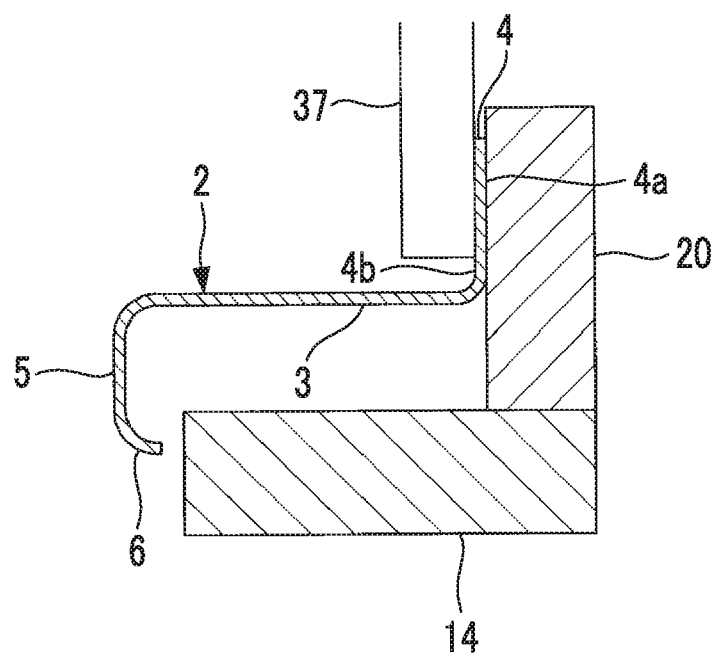
FIG. 4 is a view schematically illustrating an end surface taken along line IV-IV of FIG. 1.

The machining device 12 has an end mill 37 extending in the panel thickness direction of the flat surface portion 3. The end mill 37 is movable in a panel thickness direction of the first curved surface portion 4 and cuts the workpiece 2 by coming into contact with the workpiece 2 supported by the supporting device 11, as illustrated in FIG. 4.

Figure 5:
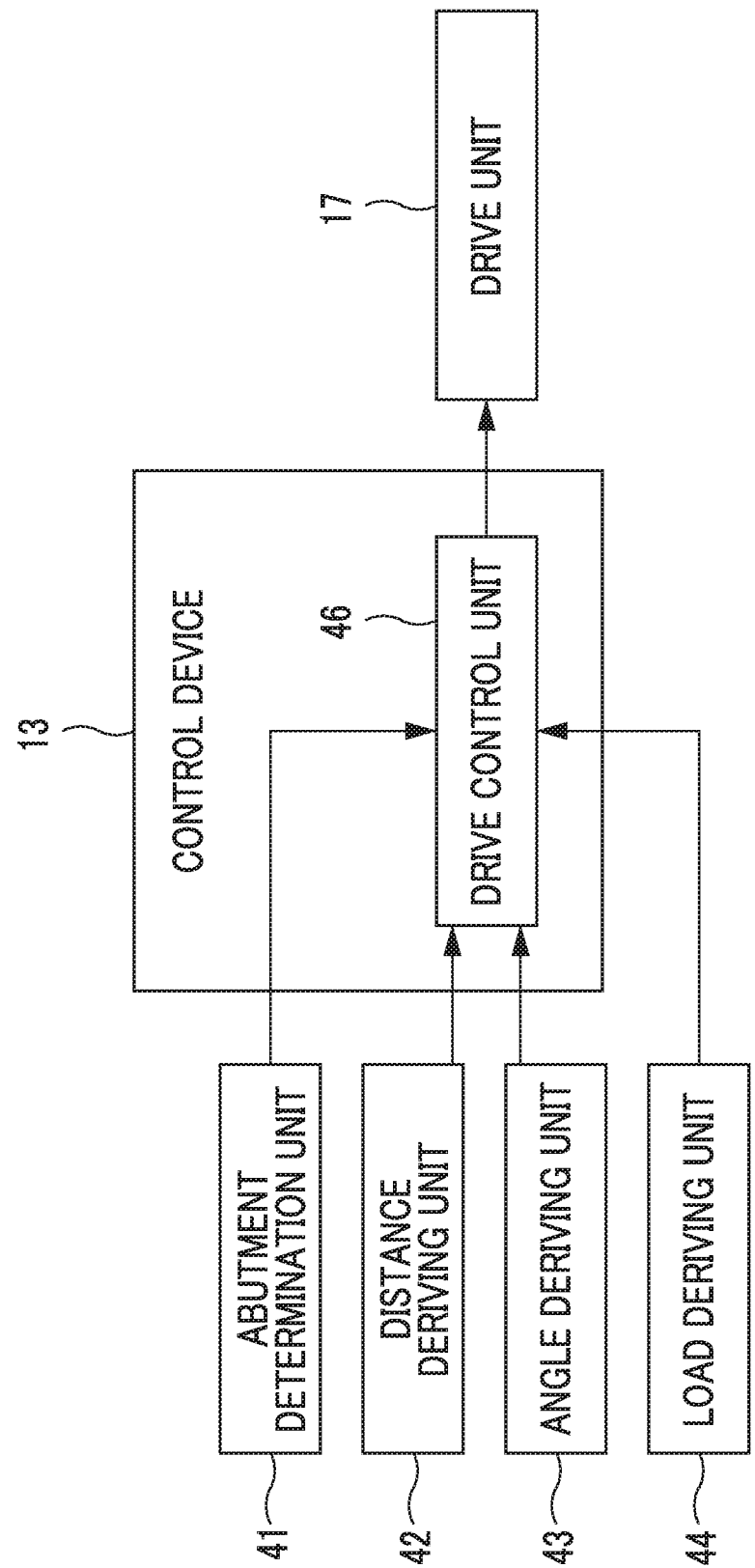
FIG. 5 is a block diagram of the processing device of FIG. 1.

In addition, the processing device 1 includes various types of sensors. Specifically, as shown in FIG. 5, the processing device includes an abutment determination unit 41 that determines whether or not the abutting roller 20 abuts against the other surface 4b of the first curved surface portion 4, a distance deriving unit 42 that derives a distance between the abutting roller 20 and the other surface 4b of the first curved surface portion 4, an angle deriving unit 43 that derives an angle formed between the first curved surface portion 4 and the flat surface portion 3, and a load deriving unit 44 that measures a load applied to the cylinder portion 25.

The abutment determination unit 41 is configured by, for example, a touch sensor which detects contact and a determination unit which determines that the abutting roller 20 abuts against the first curved surface portion 4 based on information from the touch sensor. The touch sensor is provided on the outer peripheral surface of the abutting roller 20. The determination unit and the touch sensor may be provided as the same device or may be provided as different devices. In a case of being provided as different devices, the determination unit may be provided in the control device 13.

The distance deriving unit 42 is configured by, for example, an ultrasonic sensor that emits ultrasonic waves in the predetermined direction and a distance calculation unit that calculates a distance between the abutting roller 20 and the other surface 4b of the first curved surface portion 4 based on information from the ultrasonic sensor. The ultrasonic sensor is provided in the abutting portion 19 and emits ultrasonic waves in a direction of the workpiece 2. The distance calculation unit and the ultrasonic sensor may be provided as the same device or may be provided as different devices. In a case of being provided as different devices, the distance calculation unit may be provided in the control device 13.

The abutment determination unit 41 and the distance deriving unit 42 may use a camera that images the abutting portion 19 and the workpiece 2, instead of the touch sensor and the ultrasonic sensor. In this case, the determination unit determines whether or not a gap is formed between the abutting roller 20 and the first curved surface portion 4 from image data which is captured by the camera, and may determine that the abutting roller abuts against the first curved surface portion in a case where it is determined that no gap is formed. Then, in a case where it is determined that a gap is formed between the abutting roller 20 and the first curved surface portion 4, the distance calculation unit calculates a distance of the gap from image data. Accordingly, a distance between the abutting roller 20 and the other surface 4b of the first curved surface portion 4 may be derived.

The angle deriving unit 43 is configured by, for example, a camera that images a part or the entirety of the workpiece 2 and an angle calculation unit that calculates an angle formed between the first curved surface portion 4 and the flat surface portion 3 based on image data from the camera. The camera and the angle calculation unit may be provided as the same device or may be provided as different devices. In a case of being provided as different devices, the angle calculation unit may be provided in the control device 13.

The load deriving unit 44 is configured by, for example, a load sensor that detects a resistance force applied to the cylinder portion 25 provided in the first clamp device 15 and a load calculation unit that calculates a load applied to the cylinder portion 25 based on information from the load sensor. The load sensor and the load calculation unit may be provided as the same device or may be provided as different devices. In a case of being provided as different devices, the load calculation unit may be provided in the control device 13.

The control device 13 is configured by, for example, a central processing unit (CPU), a random access memory (RAM), a read only memory (ROM), and a computer readable storage medium. For example, a series of processes for realizing various types of functions are stored in a storage medium in a form of a program, and the program is read by the CPU with the RAM to execute an information processing and computing process, thereby realizing the various types of functions. The program may be applied in a form of being installed in advance in the ROM or other storage media, a form of being provided in a state of being stored in the computer readable storage medium, and a form of being distributed via communication means in a wired or wireless manner. The computer readable storage medium refers to a magnetic disk, a magneto-optical disk, a CD-ROM, a DVD-ROM, and a semiconductor memory.

As shown in FIG. 5, the control device 13 has a drive control unit 46 that controls the drive unit 17 based on data from the abutment determination unit 41, the distance deriving unit 42, the angle deriving unit 43, and the load deriving unit 44.

The drive control unit 46 drives the drive unit 17 based on determination by the abutment determination unit such that the abutting roller 20 abuts against the first curved surface portion 4. Specifically, in a case where the abutment determination unit 41 determines that the abutting roller 20 abuts against the first curved surface portion 4, the drive unit 17 is controlled such that the upper roller 32 and the lower roller 34 maintain abutting positions. In addition, in a case where the abutment determination unit 41 determines that the abutting roller 20 has not abutted against the first curved surface portion 4, the upper roller 32 and the lower roller 34 are moved such that the first curved surface portion 4 abuts against the abutting portion 19.

In addition, the drive control unit 46 drives the drive unit 17 based on a distance derived by the distance deriving unit 42 such that the abutting roller 20 abuts against the first curved surface portion 4. Specifically, the upper roller 32 and the lower roller 34 are moved such that the first curved surface portion 4 moves in the direction of the abutting portion 19 by the length of the distance derived by the distance deriving unit 42.

In addition, the drive control unit 46 drives the drive unit 17 based on an angle derived by the angle deriving unit 43 such that the abutting roller 20 abuts against the first curved surface portion 4. Specifically, the upper roller 32 and the lower roller 34 are moved such that the first curved surface portion 4 moves in the direction of the abutting portion 19 by the size of the angle derived by the angle deriving unit 43.

In addition, the drive control unit 46 drives the drive unit 17 based on a load derived by the load deriving unit 44 such that the load decreases. Specifically, a load continuously applied to the cylinder portion 25 is measured by the load deriving unit 44, and the upper roller 32 and the lower roller 34 are moved such that the load is equal to or smaller than a predetermined threshold value.

Next, the action of the processing device 1 according to the embodiment will be described.

First, the workpiece 2 is introduced into the processing device 1. At this time, the workpiece is introduced such that the first curved surface portion 4 is positioned between the abutting roller 20 and the pressing roller 23 and the flat surface portion 3 is positioned between the upper roller 32 and the lower roller 34. The workpiece 2 introduced in the processing device 1 is transported in the predetermined direction by a drive force of the motor 26 provided in the abutting roller 20.

The processing device 1 transports the workpiece 2 in the predetermined direction, moves the pressing roller 23 in the direction of the abutting portion 19 by a drive force from the cylinder portion 25, and presses the other surface 4b of the first curved surface portion 4 with the pressing roller 23. The first curved surface portion 4 pressed by the pressing roller 23 is in a state of abutting against the abutting roller 20. As the abutting roller 20 abuts against the one surface 4a of the first curved surface portion 4, the movement of the first curved surface portion 4 in the panel thickness direction is restricted. In this manner, the first clamp device 15 sandwiches the first curved surface portion 4. In addition, simultaneously, the processing device 1 moves the upper roller 32 and the lower roller 34 to cause the flat surface portion 3 to be sandwiched therebetween. At this time, the second clamp device 16 sandwiches the flat surface portion 3 such that the movement of the flat surface portion 3 in the panel thickness direction (up-and-down direction in FIG. 1) is allowed.

Figure 6:
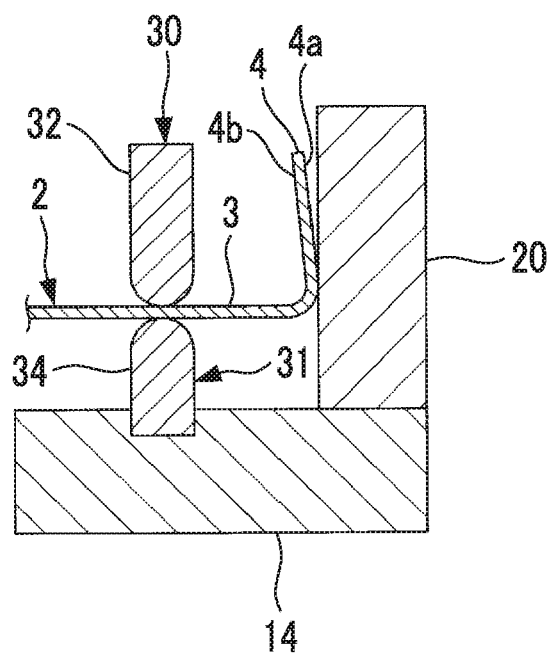
FIG. 6 is a view illustrating a state where a first curved surface portion has not abutted against an abutting portion in the processing device of FIG. 2.
Figure 7:
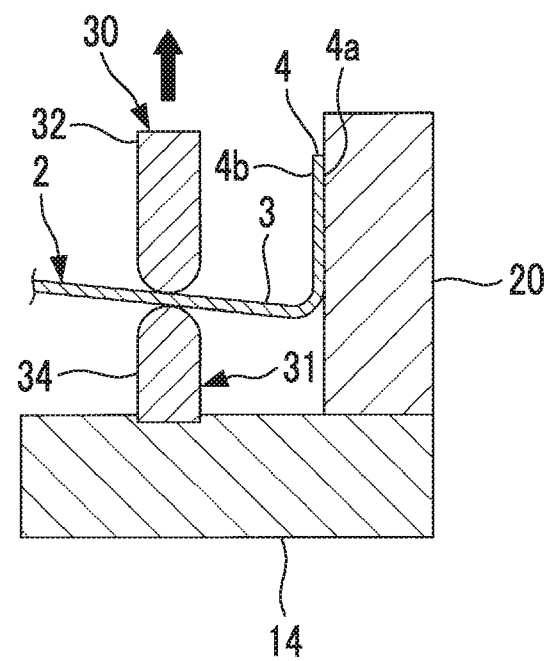
FIG. 7 is a view illustrating a state where the first curved surface portion abuts against the abutting portion in the processing device of FIG. 2.

At this time, in a case where the various types of sensors determine that the first curved surface portion 4 and the abutting portion 19 are separated from each other, the control device 13 controls the drive unit 17 to move the upper roller 32 and the lower roller 34 such that the first curved surface portion 4 abuts against the abutting portion 19. For example, in a case where an upper portion of the first curved surface portion 4 is more separated from the abutting roller 20 than a lower portion is as illustrated in FIG. 6, the upper roller 32 and the lower roller 34 are moved upward as illustrated in FIG. 7. Consequently, the entire workpiece 2 is rotated about a central axis extending in the longitudinal direction of the workpiece 2, and thereby the first curved surface portion 4 abuts against the abutting portion 19. In addition, for example, in a case where the upper portion of the first curved surface portion 4 is positioned closer to the abutting roller 20 than the lower portion is, the upper roller 32 and the lower roller 34 are moved downward. Consequently, the first curved surface portion 4 abuts against the abutting portion 19.

In a state where the first curved surface portion 4 abuts against the abutting portion 19, the processing device 1 moves the end mill 37 to bring the first curved surface portion 4 into contact with the end mill 37. Then, the end mill 37 performs machining on the other surface 4b of the first curved surface portion 4, thereby reducing a panel thickness of the first curved surface portion 4.

In this manner, the processing device 1 according to the embodiment performs processing on the workpiece 2.

In the embodiment, the following operational effects are achieved.

In the embodiment, the movement of the first curved surface portion 4 in the panel thickness direction is restricted as the pressing portion 22 presses the first curved surface portion 4 and the one surface 4a of the first curved surface portion 4 is caused to abut against the abutting portion 19. Accordingly, a position of the flat surface portion 3 in a state where the first curved surface portion 4 abuts against the abutting portion 19 differs depending on an angle formed between the first curved surface portion 4 and the flat surface portion 3.

In the embodiment, since the second clamp device 16 that supports the flat surface portion 3 is movable in the panel thickness direction of the flat surface portion 3, movement to a position corresponding to the flat surface portion 3 is possible. Accordingly, even when the flat surface portion 3 is at any position, the flat surface portion 3 can be supported by moving the second clamp device 16. Therefore, regardless of an angle of the workpiece 2, which is formed between the first curved surface portion 4 and the flat surface portion 3, the flat surface portion 3 can be supported by the second clamp device 16 in a state where the first curved surface portion 4 abuts against the abutting portion 19. Therefore, even when the workpiece 2 has a complicated shape, the workpiece 2 can be processed in a stable state by causing the first curved surface portion 4 to abut against the abutting roller 20 (reference surface). From the above, processing accuracy can be improved.

In addition, since the flat surface portion 3 can be supported at a position corresponding to the flat surface portion 3, the abutting roller can abut against the first curved surface portion 4 and stress generated in the workpiece 2 can be suppressed in a state where the flat surface portion 3 is supported. Accordingly, the deformation of the workpiece 2 can be suppressed. Therefore, deformation in which the workpiece 2 is lifted up from the abutting roller 20 (deformation in which the first curved surface portion 4 and the abutting roller 20 are separated from each other) can be prevented. As described above, as the first curved surface portion 4 reliably abuts against the abutting roller 20 (reference surface), the workpiece 2 can be processed in a stabler state.

In addition, when the drive unit 17 drives the second clamp device 16 to move the flat surface portion 3, the first curved surface portion 4 formed integrally with the flat surface portion 3 also moves. That is, the drive unit 17 can move the first curved surface portion 4 via the flat surface portion 3 by driving the second clamp device 16.

In the embodiment, the drive unit 17 is driven based on determination by the abutment determination unit 41 such that the abutting roller 20 abuts against the first curved surface portion 4. Accordingly, as the first curved surface portion 4 more reliably abuts against the abutting roller 20 (reference surface), the workpiece 2 can be processed in a stable state.

In addition, in the embodiment, the drive unit 17 is driven based on a distance derived by the distance deriving unit 42 such that the abutting roller 20 abuts against the first curved surface portion 4. Accordingly, as the first curved surface portion 4 more reliably abuts against the abutting roller 20 (reference surface), the workpiece 2 can be processed in a stable state.

In addition, in the embodiment, the drive unit 17 is driven based on an angle derived by the angle deriving unit 43 such that the abutting roller 20 abuts against the first curved surface portion 4. Accordingly, as the first curved surface portion 4 more reliably abuts against the abutting roller 20 (reference surface), the workpiece 2 can be processed in a stable state.

In addition, when the first curved surface portion 4 of the workpiece 2 separates from the abutting roller 20, a load is applied to the pressing portion 22 in a direction opposite to a pressing direction. In the embodiment, the load is derived by the load deriving unit 44, and based on the derived load, the drive unit 17 is driven such that the load decreases. Accordingly, as the first curved surface portion 4 more reliably abuts against the abutting roller 20 (reference surface), the workpiece 2 can be processed in a stable state.

As described above, in the processing device 1 of the embodiment, variations in the panel thickness of the workpiece 2 after processing can be decreased since the workpiece 2 can be processed in a stable state. Accordingly, since processing pass can be reduced, it is possible to shorten a processing step.

Next, a modification example of the embodiment will be described based on FIG. 8.

Figure 8:
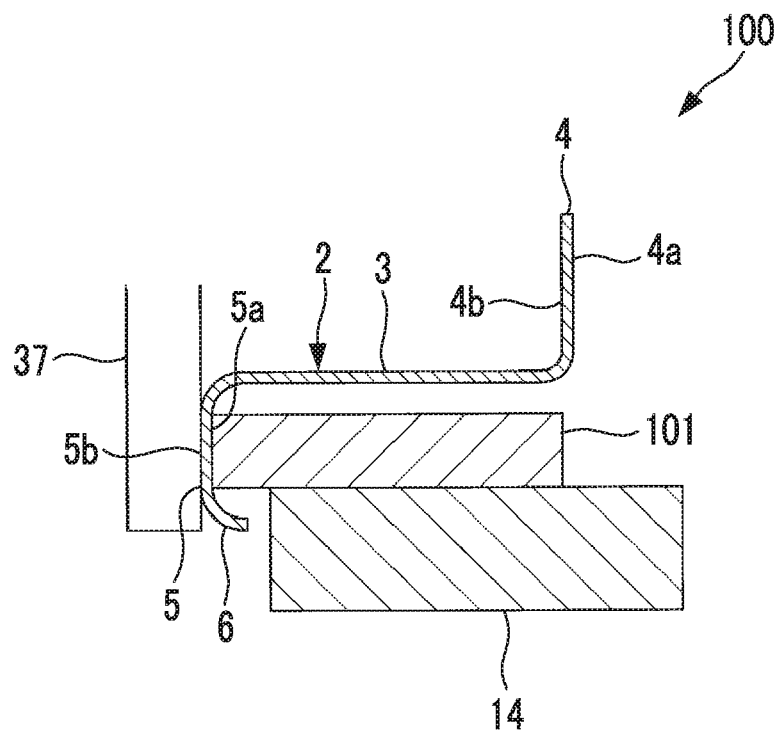
FIG. 8 is a schematic end view illustrating a modification example of the processing device of FIG. 1.

A processing device 100 illustrated in FIG. 8 is used when processing the second curved surface portion 5. As illustrated in FIG. 8, an abutting portion 101 is provided to protrude from the main body 14 of the supporting device 11, and is disposed to enter between the flat surface portion 3 and the lip portion 6.

In the modification example, one surface 5a of the second curved surface portion 5 abuts against the abutting portion 101 as the pressing portion 22 (not illustrated) presses the other surface 5b of the second curved surface portion 5. In addition, also in the modification example, the flat surface portion 3 is supported by the second clamp device 16 as in the embodiment. Since a configuration of the second clamp device 16 is the same as the embodiment, detailed description thereof will be omitted.

In the modification example, since the lip portion 6 and the abutting portion 19 do not interfere with each other, the second curved surface portion 5 can be caused to abut against the abutting portion 19. Thus, even when performing processing on the second curved surface portion 5, the same effects as the embodiment are achieved.

The modification example and the embodiment may be combined with each other. That is, the processing device 100 described in the modification example may be continuously provided on a downstream side of the processing device 1 described in the embodiment. By doing so, as a series, processing of reducing a panel thickness can be accurately performed on the first curved surface portion 4 and the second curved surface portion 5. Therefore, the processing step can be shortened.

The present invention is not limited to the invention according to the embodiment, and can be modified as appropriate without departing from the gist of the invention.

For example, although an example in which the abutment determination unit 41, the distance deriving unit 42, the angle deriving unit 43, and the load deriving unit are provided is described in the embodiment, the present invention is not limited thereto. Any one of the abutment determination unit 41, the distance deriving unit 42, the angle deriving unit 43, and the load deriving unit 44 may be selected and provided.

In addition, in the embodiment, for example, the abutting roller 20 may be provided with a plurality of contact sensors. Since which portion of the first curved surface portion 4 is lifted up can be determined by having such a configuration, the second clamp device 16 can be more accurately moved, and the first curved surface portion 4 can be caused to abut against the abutting portion 19.

In addition, a shape of the workpiece 2 is not limited to the shape in the embodiment. For example, the workpiece may be a workpiece having a substantially L-shaped section in the longitudinal direction. In addition, the workpiece may be a workpiece, which has a substantially Z-shaped section and is not provided with the lip portion 6, or may be a workpiece in which both of the first curved surface portion 4 and the second curved surface portion 5 are provided with the lip portion 6.

In addition, although an example in which the workpiece is transported in the predetermined direction as the workpiece 2 is sandwiched between the rollers is described in the embodiment, the present invention is not limited thereto. A configuration where transportation is not performed by causing the workpiece 2 to abut against a block may be adopted.

Figure 9:
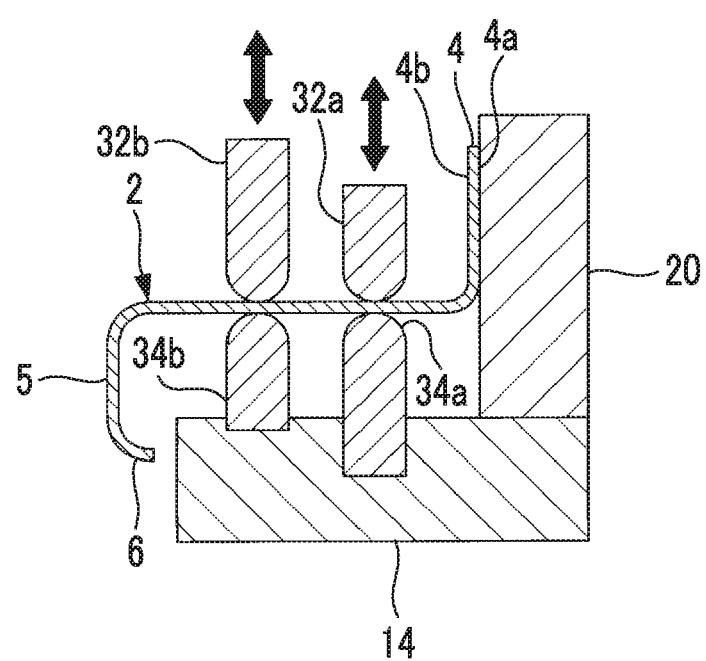
FIG. 9 is a schematic end view illustrating another modification example of the processing device of FIG. 1.

In addition, although a configuration where the upper roller 32 and the lower roller 34 are provided one by one in the second clamp device 16 is described in the embodiment, the present invention is not limited thereto. For example, as illustrated in FIG. 9, two upper rollers 32 and two lower rollers 34 may be provided. With such a configuration, the first curved surface portion 4 can be more reliably caused to abut against the abutting roller 20 by interlocking action of the upper roller 32a and the lower roller 34a on a first curved surface portion 4 side with action of the upper roller 32b and the lower roller 34b on a second curved surface portion 5 side.

REFERENCE SIGNS LIST

1: processing device
2: workpiece (object to be processed)
3: flat surface portion (second portion)
4: first curved surface portion (first portion)
4a: one surface
4b: the other surface
5: flat surface portion (second portion)
6: lip portion
11: supporting device
12: machining device (processing unit)
13: control device (control unit)
15: first clamp device (restricting portion)
16: second clamp device (supporting portion)
17: drive unit
19: abutting portion
20: abutting roller
21: abutting roller supporting portion
22: pressing portion
23: pressing roller
24: pressing roller supporting portion
25: cylinder portion
26: motor
32: upper roller
34: lower roller
37: end mill

The invention claimed is:

1. A processing device that processes an object to be processed integrally having a panel-shaped first portion and a panel-shaped second portion which bends and extends from an edge of the first portion, the processing device comprising:
a restricting portion that has an abutting portion, which abuts against one surface of the first portion, and a pressing portion, which presses the other surface of the first portion in a direction of the abutting portion, and restricts movement of the first portion in a panel thickness direction;
a supporting portion that is movable in a panel thickness direction of the second portion and supports the second portion; and
a processing unit that processes the other surface of the first portion.

2. The processing device according to claim 1, further comprising:
an abutment determination unit that determines whether or not the abutting portion abuts against the first portion;
a drive unit that moves the supporting portion to move the second portion; and
a control unit that drives the drive unit based on determination by the abutment determination unit such that the abutting portion abuts against the first portion.

3. The processing device according to claim 1, further comprising:
a distance deriving unit that derives a distance between the abutting portion and the other surface of the first portion;
a drive unit that moves the supporting portion to move the second portion; and
a control unit that drives the drive unit based on the distance derived by the distance deriving unit such that the abutting portion abuts against the first portion.

4. The processing device according to claim 1, further comprising:
an angle deriving unit that derives an angle formed between the first portion and the second portion;
a drive unit that moves the supporting portion to move the second portion; and
a control unit that drives the drive unit based on the angle derived by the angle deriving unit such that the abutting portion abuts against the first portion.

5. The processing device according to claim 1, further comprising:
a load deriving unit that derives a load applied to the pressing portion;
a drive unit that moves the supporting portion to move the second portion; and
a control unit that drives the drive unit based on the load derived by the load deriving unit such that the load decreases.

6. A processing method for an object to be processed integrally having a panel-shaped first portion and a panel-shaped second portion which bends and extends from an edge of the first portion, the processing method comprising:
a step of restricting movement of the first portion in a panel thickness direction by causing one surface of the first portion to abut against an abutting portion and pressing the other surface of the first portion with a pressing portion;
a step of supporting the second portion such that movement of the second portion in a panel thickness direction is allowed; and
a step of processing the other surface of the first portion.

* * * * *